May 30, 1967      MING TONG CHAN      3,323,118
WATERPROOF ELECTRIC BATTERY LANTERN

Filed June 24, 1965      3 Sheets-Sheet 1

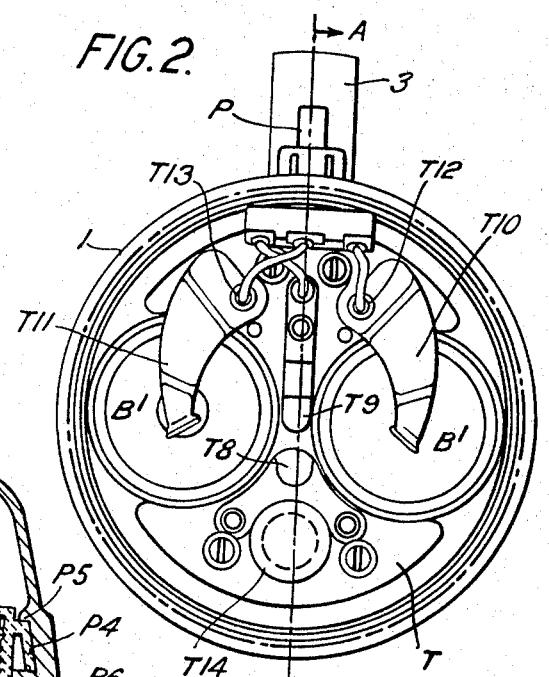
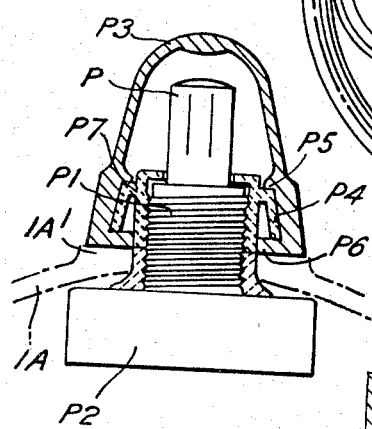
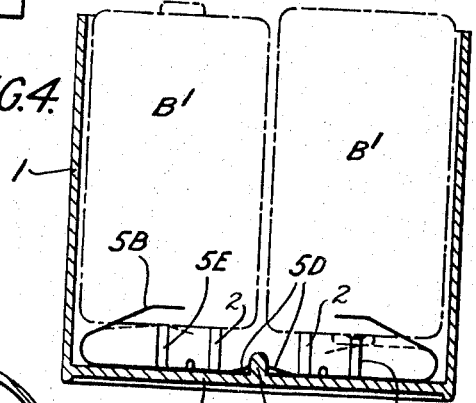
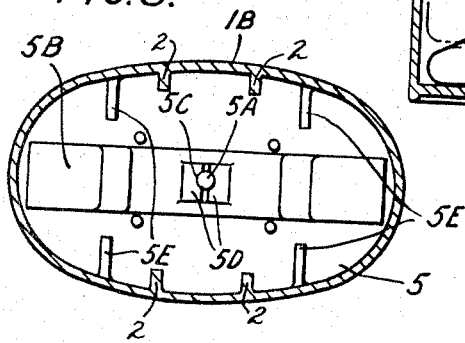

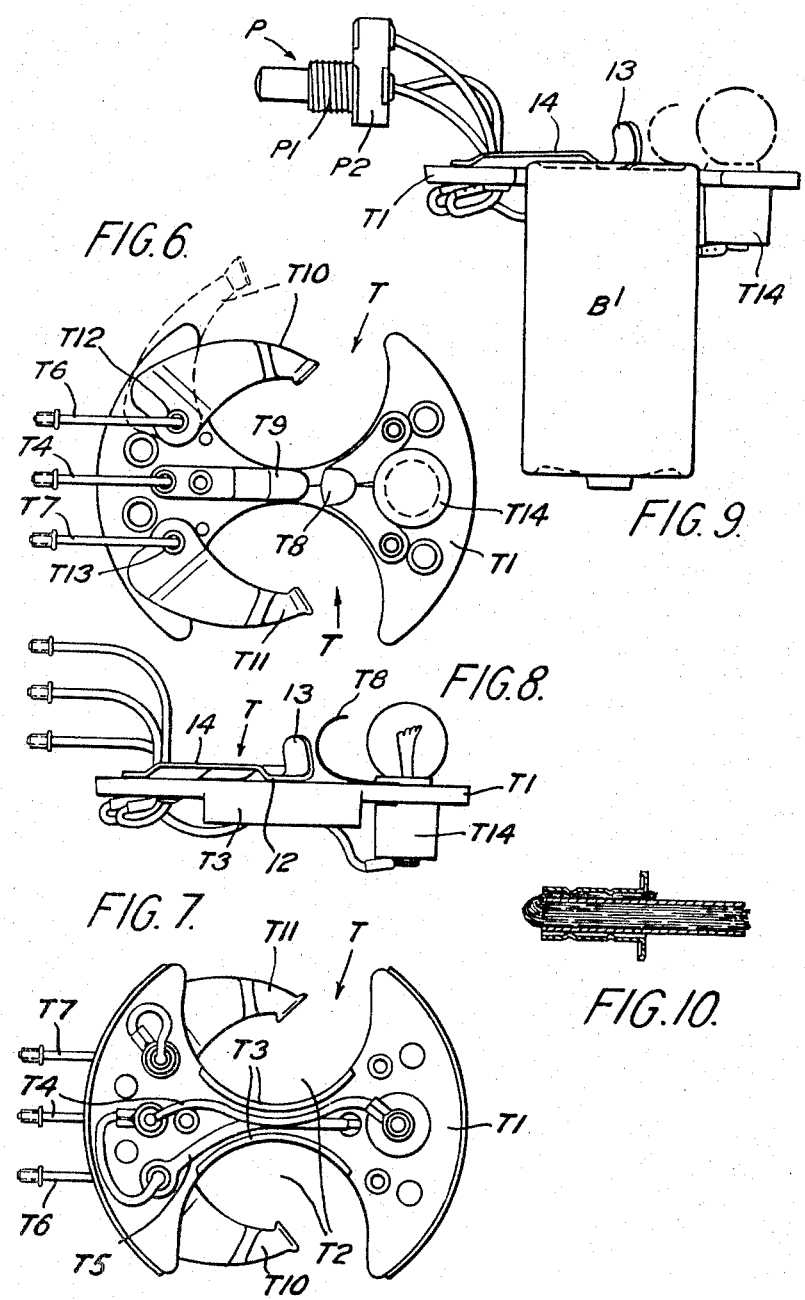

United States Patent Office 3,323,118
Patented May 30, 1967

3,323,118
WATERPROOF ELECTRIC BATTERY LANTERN
Ming Tong Chan, Kwan Tong, Kowloon, Hong Kong, assignor to Herbert J. Ashe, Stamford, Conn.
Filed June 24, 1965, Ser. No. 466,708
8 Claims. (Cl. 340—321)

ABSTRACT OF THE DISCLOSURE

An electric battery lantern comprising an insulated body for housing a plurality of battery cells and a detachable reflector unit. The battery space is defined by a closed end of the body and an opposite insulated terminal member having a pair of swingable contact elements adapted to provide access to the battery space or to hold inserted batteries in place and establishing electrical connection therewith. In addition to the main light a blinker light is adapted to transmit light through a translucent body portion.

This invention relates to flashlights or battery operated lanterns and more particularly to waterproof electric lanterns.

Many forms of battery lanterns are known but, in general these have the disadvantage of not being entirely waterproof or of becoming leaky after having been opened for bulb or battery replacement. Electrical connections and other metal parts housed within such a lantern are consequently susceptible to corrosion which can severely limit the working life and efficiency of operation of the lantern.

It is an object of this invention to reduce this disadvantage and to provide a battery lantern which remains waterproof.

The lantern has a body for housing one or more batteries, a detachable reflector unit permitting access into the body for insertion and removal of the battery or batteries, and a switch. According to the invention, sealing means are provided with co-operate between the reflector unit and the body; the switch is covered with a flexible sealing cap, and the battery contacts are formed as arcuate, pivotally mounted arms to permit ready insertion of fresh batteries with a minimum disturbance of sealing members. Thus, a waterproof lantern suitable for rough use is provided.

It is frequently useful to provide a warning or flashing blinker light and to this end, means for mounting a blinker bulb is included. In order to reduce expense attendant with the fitting of a flashing blinker light, an associated lens and sealing means between the lens and the body, the body is made from translucent material which may be entirely, or partially red in color.

One form of battery lantern in accordance with this invention will now be particularly described, by way of example, with reference to the accompanying drawings in which:

FIGURE 2 is a view taken in the direction of arrow B of FIGURE 1 with the reflector unit removed;

FIGURE 3 is a partial section taken on line C—C of FIGURE 1 omitting circuit connections and electric leads;

FIGURE 4 is a section taken on line D—D of FIGURE 1;

FIGURE 5 is a section taken in the direction of arrow E of FIGURE 4;

FIGURE 6 is a plan view of an electrical terminal unit;

FIGURE 7 is a bottom plan view of the electrical terminal unit showing the electrical connections;

FIGURE 8 is a side view of FIGURE 6;

FIGURE 9 shows the relative position of a battery and the electrical terminal unit, and FIGURE 10 is a section through an eyelet connection.

Figure 1:
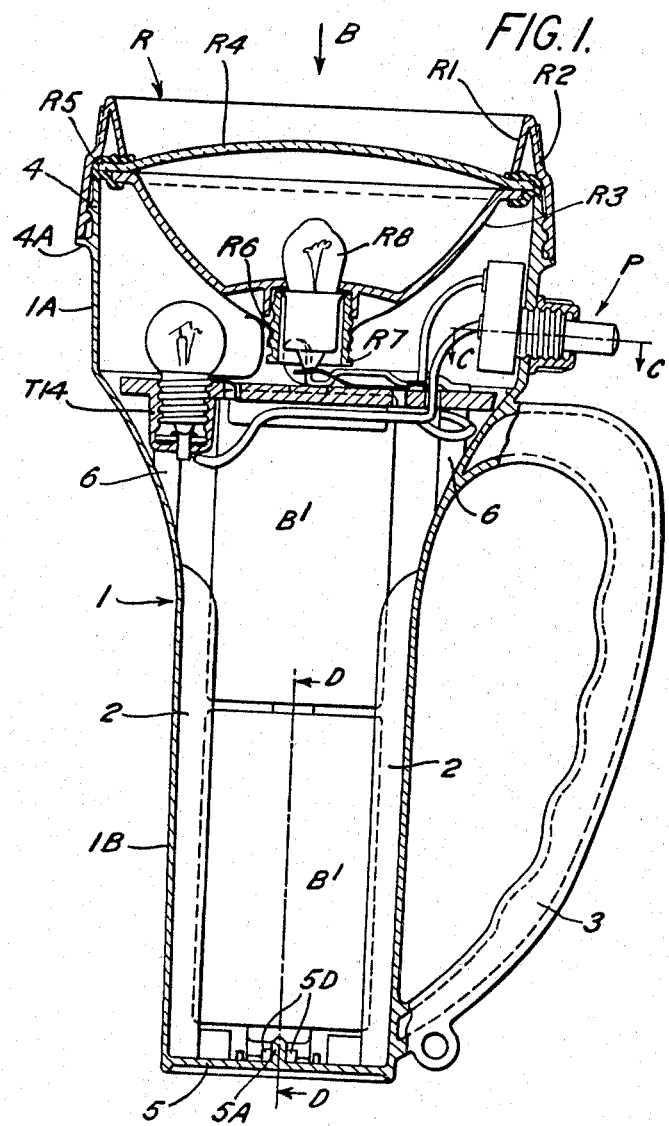
FIGURE 1 is a longitudinal section taken on line A—A of FIGURE 2.

The lantern shown in the drawings has four battery cells B′ which may be of the commercial D cell type housed in a body 1 which is moulded from a red translucent plastic material.

The body 1 comprises essentially two parts, a generally cylindrical portion 1A and an oval portion 1B, see FIGURE 5, in which the battery cells are housed. Longitudinal ribs 2 moulded integrally with the body serve to retain the battery cells in position. A handle 3 is moulded integrally with the body of the flat portion of the oval portion 1B. The body 1 is closed off by an integral end panel 5 which is provided with a projection 5A. The body portion 1A is threaded at numeral 4 to receive a reflector unit R which, when in position, abuts against an annular flange 4A.

The reflector unit R comprises a sleeve having an inner member R1 and a stepped outer member R2 as shown. A reflector R3 and a lens R4 each have annular flanges which are held together by a generally U-sectioned sealing ring R5. As shown in FIGURE 1, the sealing ring R5 is a snug fit in the stepped outer ring, and when the reflector unit is tightened on to the threaded body, the sealing ring is squeezed between the inner member R1 and the annular end of body part 1A to form a waterproof seal.

An internally threaded sleeve R6 is rolled or otherwise fastened into the reflector, and an externally threaded member R7 serves to retain a front bulb R8.

An electrical terminal unit T is shown in detail in FIGURES 6, 7 and 8 and comprises a bridge T1 made from an insulating material. The bridge is attached to the body by four self-tapping screws (not shown) which are screwed into pillars 6 (FIGURE 1) integrally moulded with the body. The bridge has two U-shaped recesses T2 permitting the insertion or removal of battery cells and two reinforcing checks T3 form a channel which accommodates an electrical lead T4 and a permanent contact strip T5. Other leads are shown as T6 and T7, and for ease is assembly each lead has an eyelet (FIGURE 10) for insertion into corresponding sockets formed in a press-button switch P. Two front bulb contacts T8 and T9 are riveted to the bridge as shown in FIGURE 6, and two battery contact arms T10 and T11 are pivoted to the bridge by eyelets T12 and T13. As shown in FIGURE 8 the contact arms T10 and T11 are each formed with a contact area 12 and an upstanding flange 13. The flanges 13 enable a user to grip the arms and displace them from a full line position (FIGURES 6 and 9) in which the contact area 12 is in electrical contact with a battery to a dotted line position (see FIGURE 6) permitting access into the body for insertion and removal of batteries from the front, thus avoiding the necessity for a second, rear battery loading opening, requiring a second seal.

From FIGURES 8 and 9 it will be seen that each of the contact arms T10 and T11 has an arch-shaped portion 14 which provides a clearance with the battery casing (see especially FIGURE 9) to reduce the possibility of a battery short circuit. After the batteries are inserted, the arms T10 and T11 are moved to their full line position as clearly shown in FIGURES 6 and 9.

The bridge T also carries a threaded socket T14 for a threaded blinker bulb of known construction. The electrical connections for the blinker socket are shown in FIGURES 1, 7 and 8. From these figures it will be evident that the lead T4 extends from the push button switch P to a terminal located in the base of the socket and that the front lamp contact T8 is connected to the blinker socket T14.

The push button switch P, having as its operating member a plunger, has a threaded projection P1 and a body P2 housing the switching mechanism (not shown). A flexible rubber sealing cap P3 covers the operating plunger. The cap has an annular groove P4 defined by an abutment P5 and an inwardly projecting flange P6 between which a plastic nut P7 is located. From FIGURE 3 will be seen that the flange P6 is compressed against a boss 1A′ formed on the body 1A when the nut is tightened on to the threaded projection, thereby forming a watertight seal yet permitting operation.

As previously mentioned, a projection 5A (FIGURES 1 and 4) is moulded integrally with the body and forms a securing means for a contact spring 5B. This contact spring 5B has an aperture 5C and two flaps 5D, which, as shown in FIGURE 4, bite into the projection to hold the contact spring in position. Also moulded integrally with the body are four stops 5E which limit the downward motion of the batteries. The provision of an integrally moulded projection 5A overcomes the necessity to drill the body for a screw or a rivet, which is the conventional method of retaining the contact spring in position, and thus reduce still further the possibility of water entering the lantern, while providing for ease of assembly.

The switch P may be of the multiple push-to-operate type, providing for a lantern ON, blinker ON, lantern and blinker ON, and OFF function, or merely lantern and blinker ON, and OFF operation.

Only a single seal at R5 (FIGURE 1) need be disturbed for routine servicing, such as either bulb or battery replacement. This seal is a moulded rubber ring which can readily be made to retain its sealing elasticity for a long time. The lantern of the present invention thus remains waterproof through repeated opening and closing for battery or bulb replacements.

While there has been described and illustrated a certain preferred embodiment of the present invention, it will be apparent to those skilled in the art that various changes and modifications may be made without deviating from the principle and intent of this invention which shall be limited only by the scope of the appended claims.

What is claimed is:

1. In a waterproof electric flashlight the combination of: a tubular housing having a front cylindrical portion and a rear portion of generally oval cross section, the latter defining a pair of battery spaces adjacent each other and having an integral closed end; a resilient, conductive terminal element secured by frictional engagement to said housing at said closed end of said oval portion; a second terminal element of insulating material secured into said housing at the other end of said oval portion and extending across said housing to define the front end of said battery spaces; said second terminal element formed with a pair of recesses to provide access to said battery spaces, and provided with a pair of pivotally mounted conductive terminal strips, each strip being swingable from a position clear of an associated battery space to a position across such battery space to provide for the insertion of batteries and the subsequent electrical circuit connection to the batteries; a switch means having an operating member extending through said housing, and a reflector unit in threaded engagement with said cylindrical portion of said housing, closing off the front portion of said tubular housing.

2. A waterproof electric flashlight as set forth in claim 1 including a blinker light, said housing being moulded of translucent material, and said blinker light when energized emitting light through said translucent mateiral.

3. A waterproof electric flashlight as set forth in claim 2 wherein said blinker light is mounted to said second terminal element in proximity to the wall of said cylindrical portion of said tubular housing, and electrical circuit connection is provided between said blinker light, said second terminal element and said switch means.

4. In a waterproof electric flashlight the combination of: a tubular housing moulded of plastic translucent material and having a front cylindrical portion and a rear portion of generally oval cross section, the latter defining a pair of battery spaces adjacent each other and having an integral closed end; a resilient, conductive terminal element secured by frictional engagement to the inside of said housing at said closed end of said oval section for establishing electrical connection to the batteries disposed in said spaces; a second terminal element of insulating material secured in said housing at the other end of said oval section and extending transversely across said housing substantially at the area where said front and rear portions merge whereby to define the front end of said battery spaces; said second terminal element formed with a pair of recesses to provide access to said battery spaces, and provided with a pair of pivotally mounted conductive terminal strips, each strip swingable from a position clear of an associated battery space to a position across such battery space to provide for the insertion of batteries and the subsequent electrical circuit connection to the batteries; additional contact means disposed on said second terminal element for establishing electrical circuit connection with a front reflector unit; a front reflector unit which includes a bulb in threaded engagement with said cylindrical housing portion, said reflector unit closing off the front portion of said tubular housing and when fully seated, said additional contact means establishing electrical circuit connection to said bulb; a blinker light means mounted to said second terminal element in proximity to the wall of said cylindrical housing portion and adapted when energized to transmit light through said translucent housing, and a switch means having an operating member extending through said housing, said switch means being connected in circuit to establish an electrical circuit connection from the batteries to the bulb of said front reflector unit and to said blinker light means.

5. A waterproof electric flashlight as set forth in claim 4, said rear portion including stiffening ribs formed interiorly of said housing, extending longitudinally thereof at the flat part of said oval.

6. A waterproof electric flashlight as set forth in claim 5 and including a handle integral with said housing and mounted on the flat part of said oval section.

7. A waterproof electric battery lantern comprising:
a tubular battery housing of oval cross section having one integral closed end;
a pair of stiffening ribs formed interiorly of said housing longitudinally thereof at the flat portion of said oval;
a pair of adjacent battery spaces defined between the more curved portions of said oval and said stiffening ribs;
switching means secured to said housing;
means sealing said switching means into said housing to prevent entry of moisture;
a reflector unit in threaded engagement with the other end of said housing;
a terminal member in the form of a bridge located in said housing and having a pair of openings therein substantially coextensive in cross section with the cross section of said battery spaces to provide room for the insertion of batteries into said spaces;
a pair of conductive strips pivotally secured to said terminal member at a location adjacent to the housing;
said strips each swingable from a position across a respective battery space in said housing to a position leaving the associated battery space accessible for insertion of batteries into said housing, and
each strip when disposed across the respective battery space adapted to establish electrical circuit connection to the batteries confined in such space.

8. A lantern as set forth in claim 7, said reflector unit being generally of circular outline, and a handle integral with said housing and mounted on a flat portion of said oval.

References Cited

UNITED STATES PATENTS

| | | | |
|---|---|---|---|
| 2,373,553 | 4/1945 | Fetterman | 240—10.68 |
| 2,496,618 | 2/1950 | Cox et al. | 340—90 |
| 2,597,073 | 5/1952 | Cunningham | 240—10.6 |
| 2,744,188 | 5/1956 | Olsen et al. | 240—10.63 |
| 3,124,306 | 3/1964 | Schotz | 240—41.55 XR |

FOREIGN PATENTS 966,578   8/1964   Great Britain.

NORTON ANSHER, *Primary Examiner.*

DAVID L. JACOBSON, *Assistant Examiner.*